C. W. LAVERS.
REPAIR JACK.
APPLICATION FILED JULY 2, 1918.

1,372,758.

Patented Mar. 29, 1921.
3 SHEETS—SHEET 1.

Inventor
Charles W. Lavers
his Attorneys

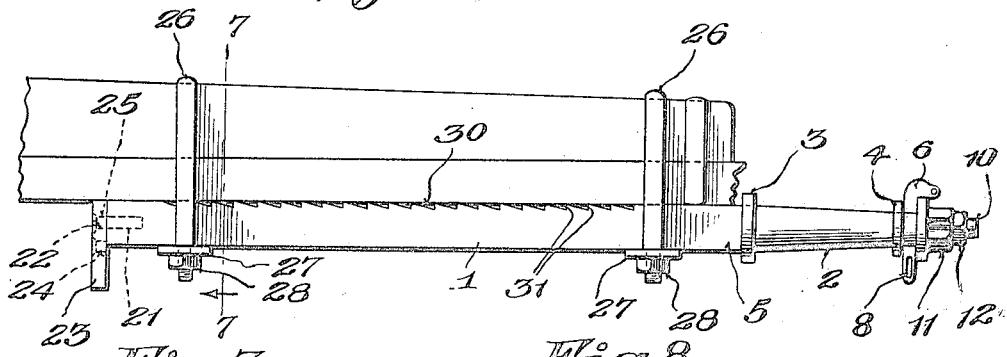
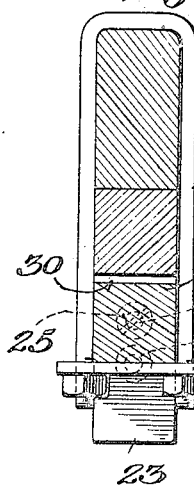
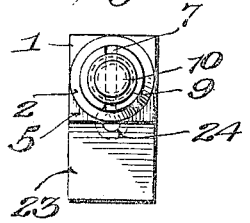
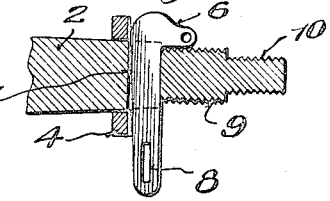
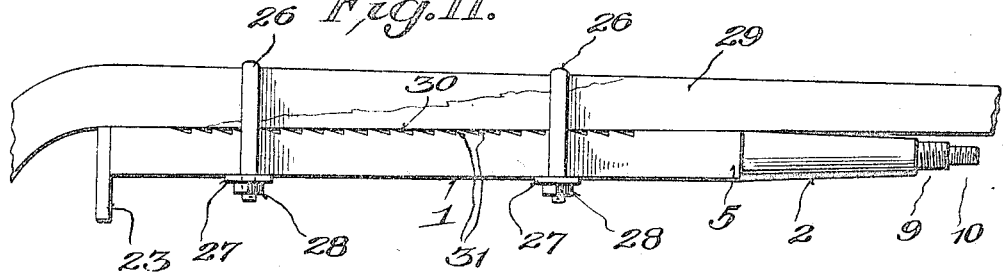

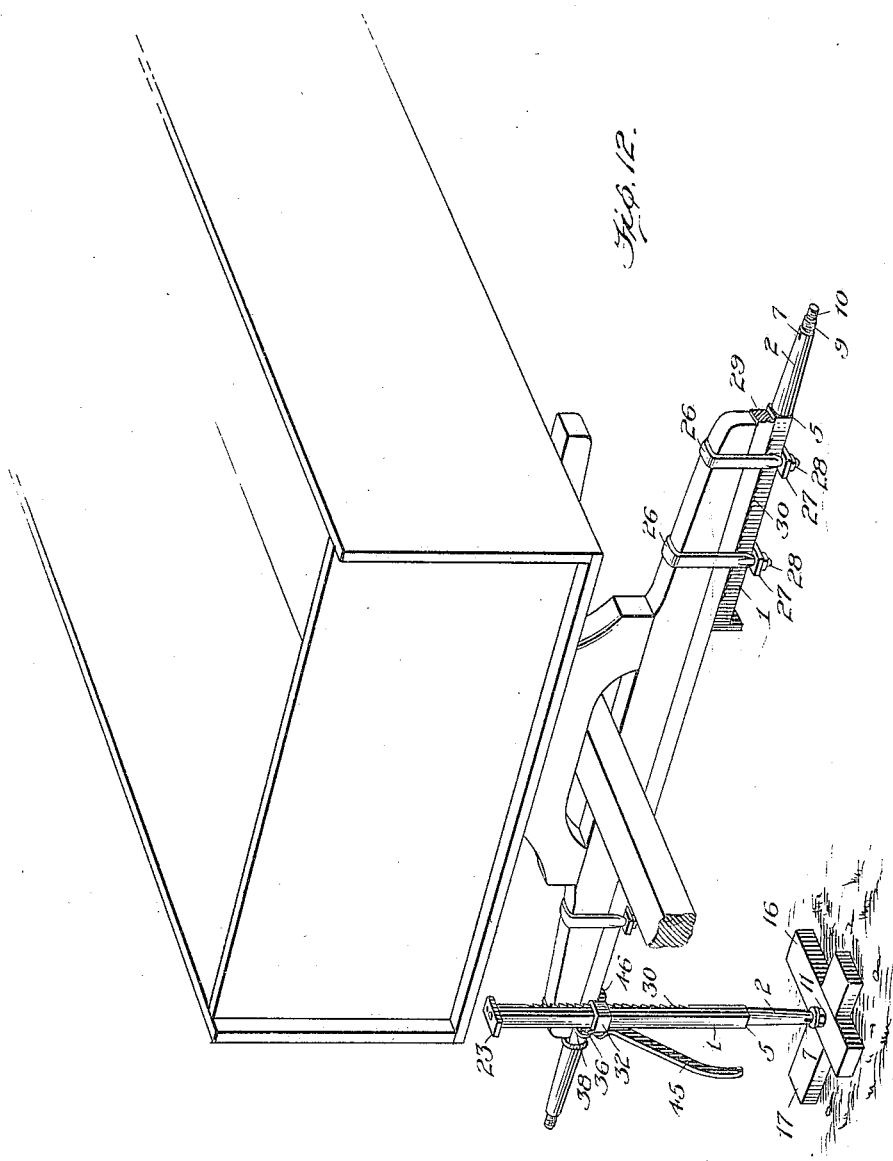

UNITED STATES PATENT OFFICE.

CHARLES W. LAVERS, OF HALIFAX, NOVA SCOTIA, CANADA, ASSIGNOR OF ONE-HALF TO FREDERICK P. RONNAN, OF HALIFAX, CANADA.

REPAIR-JACK.

1,372,758.    Specification of Letters Patent.    Patented Mar. 29, 1921.

Application filed July 2, 1918. Serial No. 243,013.

*To all whom it may concern:*

Be it known that I, CHARLES W. LAVERS, a subject of the King of Great Britain, residing at Halifax, in the Province of Nova Scotia and Dominion of Canada, have invented certain new and useful Improvements in Repair-Jacks; and I do hereby declare the following to be a full, clear, and exact description of the same, reference being had to the accompanying drawings, forming part of this specification.

This invention relates to a device consisting of a section which may be used to replace a broken axle combined with certain other parts enabling one to raise a vehicle from the ground in order to replace such broken axle or other part.

Specifically the invention contemplates the combination of two ordinary tools, a vehicle repair device and a lifting jack, in such manner that the major portion of the lifting jack may, after the lifting jack has been used to raise the wagon or other vehicle, serve as a new axle or to strengthen a broken shaft or bar of any kind, acting in the latter capacity as a splice bar.

The principal object of the present invention is to supply a combined lifting jack and vehicle repair device of wide range of usefulness and yet possessing the necessary requisites of lightness, strength, and capacity for being stored in a comparatively small space. Having in mind these various requirements, I have designed the device particularly for use in connection with heavy gun limbers, ammunition wagons, and the usual army horse drawn or motor driven trucks, but wish it understood that the device is adapted for use in connection with any wheeled vehicle of any kind, the only changes necessary being general alterations in size and strength of the various parts, all such changes being well within the skill of the ordinary artisan.

A further object of the invention is to improve each of the elements which go to make up the complete combination, such detail improvements coming under the head of sub-combinations of the main invention.

For use in army work, it is necessary that the device be so compact that it may be carried to the injured unit of the army train by a motor cycle soldier, for example, this being permitted by the utilization of the repair device or splice bar as the standard of the lifting jack, such construction requiring that only the base of the jack and the toggle mechanism of the jack be returned to the base, the major part of the jack remaining with the broken vehicle as hereinafter explained.

In the drawings,—

Fig. 6 is an elevation of my vehicle repair device used to replace a broken rear axle of a gun limber.

Fig. 7 is a sectional elevation on the line 7—7 of Fig. 6.

Fig. 8 is an enlarged view of one end of my device showing the linch pin slot and the oiling hole.

Fig. 9 is an end elevation of the device.

Fig. 10 is a longitudinal section of a portion of the axle end of the repair device.

Fig. 11 is a plan view of my device used to repair the shaft of the vehicle.

Fig. 12 is a perspective view showing my device in use in two positions in connection with an Army wagon.

Figure 1:
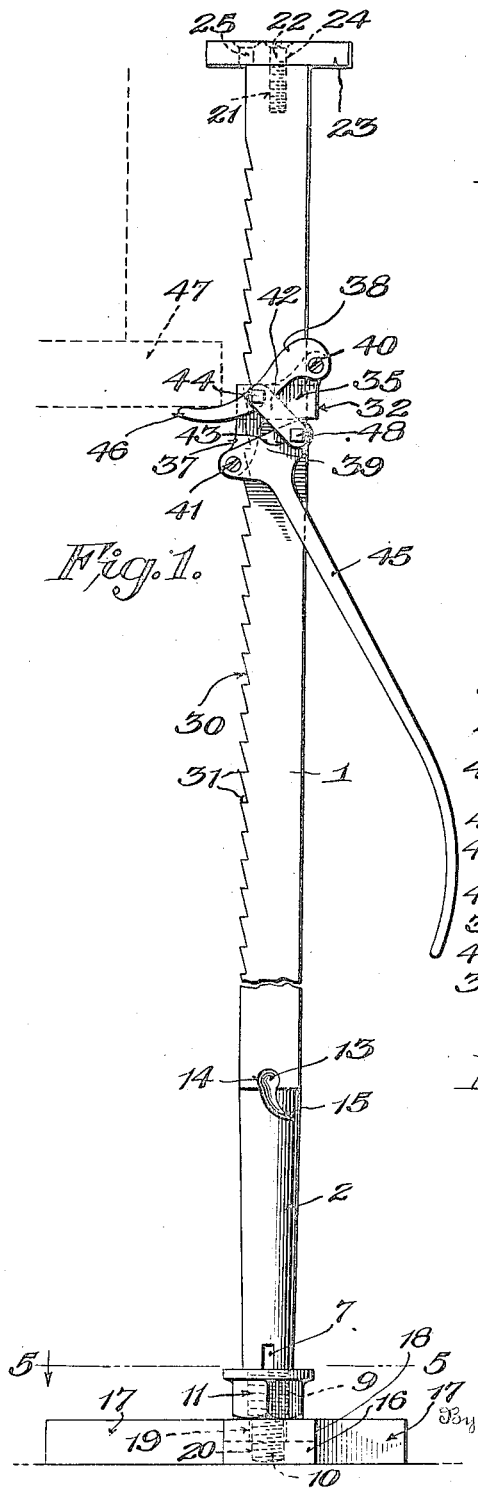
Figure 1 is an elevation of my device in its preferred form.

The standard 1 of my lifting jack device is the splice bar or axle repair section to be fitted to the broken unit of the wagon train, and consists of a bar preferably of steel and generally rectangular in form throughout the greater part of its length, but gently tapered at one end to form a bearing spindle 2 which is of the proper size and shape to fit the largest wheel of the wagon train. Smaller wheels are accommodated by the use of an inner collar 3 and an outer collar 4, both fitting loosely on the axle 2, the former being limited by the rectangular portion 5 of the standard and the latter by a linch pin 6 fitted in a slot 7 in the standard and having the usual orifice 8 for the reception of a cotter pin or other locking means.

The axle portion ends in a plurality of threaded extremities 9 and 10 having their threads reversely arranged in order to permit of the use of the axle on either side of the broken vehicle, and also so that the nuts 11 and 12 fitting thereon may serve as lock nuts for each other no matter which way the wheel of the vehicle may be turning.

At the inner end of the axle portion 2, an oil well 13 is provided consisting of a circular basin-like cavity 14 and a semi-crescent shaped channel 15 leading therefrom which provides a spiral feeding of the lubricant, resulting in a gradual supply to the bearing. The collar 3 fits over the larger portion of the duct or channel 15 but does not interfere with the flow of the lubricant in any way.

Figure 5:
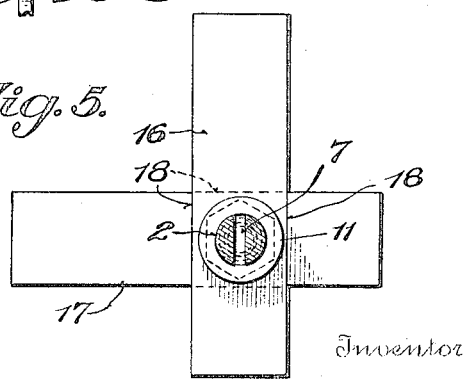
Fig. 5 is a horizontal sectional view taken on line 5—5 of Fig. 1.

The base of the jack is formed of two sections 16 and 17, each recessed as at 18 to provide smooth faces when the sections are secured together in cross formation as shown in Fig. 5, such form being maintained by passing the smaller threaded end of the standard through the orifice 19 of the upper member 16 which is not threaded, and into the threaded opening 20 of the lower member 17, and by locking the parts securely together by the nut 11 which, in addition to binding the upper member of the base to the lower member, serves to protect the threads of the section 9 while the standard is being used with the jack mechanism.

On the end of the standard remote from the axle portion is a threaded orifice 21 to receive a screw 22 for maintaining the plate 23 in proper relation to the shaft, this plate being intended as a bearing plate when the bar 1 is used as a jack standard, in which case the screw hole 24 centrally of the plate will be used, and as a right angle cleat when the bar is to be used as a splice bar or auxiliary axle section, the screw hole 25 being used in the two latter cases, such hole 25 being located to one side of the center of the plate, as best seen in Figs. 6 and 11, showing such use of the parts mentioned. When so used I provide a plurality of the usual U-shaped bolts 26, each having a plate 27 adjustably held in proper place by nuts 28, these parts being old and well known, and binding the splice bar 1 to the broken shaft or other section 29 of the disabled vehicle in the usual manner.

Between the axle portion 2 and the other end, the shaft 1 is corrugated on the upper face, that is, the face in which the oil well 13 is located, with a corrugated portion 30 either of the usual rounded shape or with sharp teeth 31, the purpose of these teeth or corrugations being not only to serve as points of support for the jack mechanism, but also to provide a roughened surface that will "bite" into the portion of the disabled vehicle to which the repair device is secured, thus providing a firm and secure connection between the two pieces.

Figure 2:
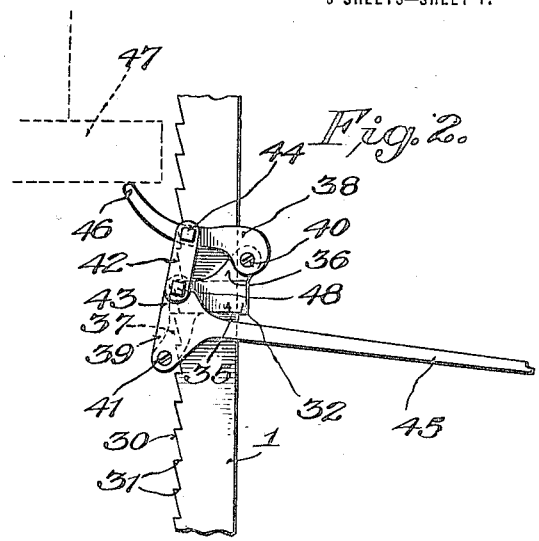
Fig. 2 is a fragmentary view of a portion of the device with the parts in different positions.
Figures 3, 4:
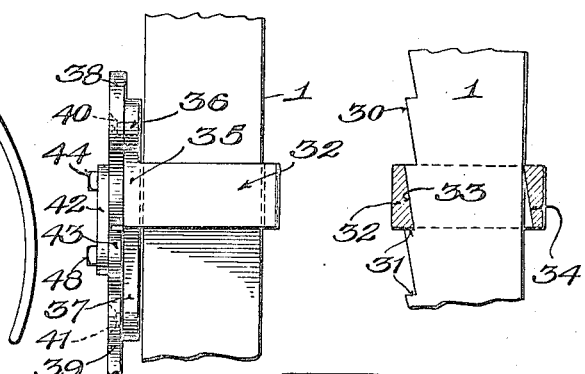
Fig. 3 is a side view of that part of the mechanism shown in Fig. 2.
Fig. 4 is a central vertical sectional view of Fig. 3, showing the shape of the boxing band.

The boxing 32 provided for furnishing a support for the various elements of the jack mechanism is of such shape as to neatly fit the rectangular portion of the standard 1. This boxing 32 is freely slidable on the shaft 1 when tilted at an angle thereto, but is provided with beveled surfaces 33 and 34 for engagement with the standard when the boxing is turned to horizontal position, these features being best illustrated in Fig. 4. One face 35 of the boxing is provided with diagonally extending lugs 36 and 37 on which are respectively pivoted a lifting finger 38 and a lever 39 held in place on said lugs by means of countersunk screws or pivots 40 and 41. A toggle member 42 connects the upper end 43 of the lever with the central portion 44 of the lifting finger, so that when the end 45 of the lever is raised, while the boxing is in horizontal position on the shaft, the toggle link 42 will raise the lifting finger 38 about its axis 40, thereby elevating the lifting end 46 of the finger 38 and raising the vehicle 47. When the parts are in the position shown in Fig. 2, with the pivotal connection 48 between the toggle and the lever, in line with the pivots 44 and 41, the weight of the vehicle 47 acting on this toggle joint will keep the parts in the position shown. Suitable supporting means may now be placed beneath the broken vehicle, and the jack removed, the base and hoisting mechanism removed and the standard 1 be put in proper place, as a repair device for axle replacement member, and therefore the only parts that would be necessary to return to the depot would be the base and jack mechanism.

What is claimed is:

1. In combination, an axle repair section, jack mechanism freely slidable thereon in one direction, and means on the axle repair section for holding said jack mechanism against movement in the opposite direction.

2. In combination, an axle repair section, means for supporting same in a vertical position, and jack mechanism engageable with the axle repair section to elevate a vehicle.

3. An axle shaft, jack mechanism on said shaft, a pair of reversely threaded extensions on one end of said shaft, a base fitting on one of said threaded extensions, and means for protecting the threads of the other threaded extension.

4. An axle repair section having a corrugated face to serve the dual function of providing a support for lifting jack mechanism and to provide means to secure a firm connection with a broken element of a wheeled vehicle.

5. In a jack device, a boxing having a plurality of lugs, a lever pivoted to one of said lugs, a lifting finger pivoted to another of said lugs, a link pivoted to said lever and to said finger and of such length as to form a right line toggle at the point of maximum elevation.

6. In combination, a standard, a boxing slidable on said standard having a pair of angularly disposed lugs on one side thereof, a lifting finger pivoted to one of said lugs beyond the line of the standard on one side thereof, a lever pivoted to the other of said lugs beyond the line of the standard on the other side thereof, a link connecting the lever and finger, and means whereby the boxing is held in any of a plurality of positions with respect to the standard.

7. In combination, a standard rectangular in cross section and provided with a roughened side, a detachable base therefor, a boxing slidable on said standard having a pair of angularly disposed lugs on one side thereof extending respectively above and below said boxing, a lifting finger pivoted to one of said lugs, a lever pivoted to the other of said lugs, and a link connecting the lever and finger.

8. In combination, a standard whose cross section is rectangular for approximately three-quarters of its length, the remainder being circular and tapered so as to afford a bearing surface or spindle, the rectangular section being provided with a roughened side, a detachable base therefor, a boxing snugly slidable on the rectangular portion of said standard, such boxing having a pair of angularly disposed lugs, on one side thereof, a lifting finger pivoted to one of said lugs, a lever pivoted to the other of said lugs, and a link connecting the lever and finger providing a right line toggle.

CHARLES W. LAVERS.

Witnesses:
F. P. RONNAN,
FRANCIS J. HEALY.